United States Patent
Kurosawa et al.

(10) Patent No.: US 11,932,138 B2
(45) Date of Patent: Mar. 19, 2024

(54) ELECTRIC VEHICLE CONTROL METHOD AND ELECTRIC VEHICLE CONTROL SYSTEM

(71) Applicant: Nissan Motor Co., Ltd., Yokohama (JP)

(72) Inventors: Takahisa Kurosawa, Kanagawa (JP); Yohei Nakamura, Kanagawa (JP); Masahito Taira, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/033,533

(22) PCT Filed: Oct. 28, 2020

(86) PCT No.: PCT/JP2020/040539
§ 371 (c)(1),
(2) Date: Apr. 24, 2023

(87) PCT Pub. No.: WO2022/091272
PCT Pub. Date: May 5, 2022

(65) Prior Publication Data
US 2023/0347748 A1 Nov. 2, 2023

(51) Int. Cl.
*B60L 7/26* (2006.01)
*B60K 1/02* (2006.01)
(Continued)

(52) U.S. Cl.
CPC ........ *B60L 7/26* (2013.01); *B60K 1/02* (2013.01); *B60K 17/356* (2013.01);
(Continued)

(58) Field of Classification Search
CPC ... B60T 1/10; B60T 1/13; B60T 1/586; B60T 2270/602; B60T 2270/604;
(Continued)

(56) References Cited

U.S. PATENT DOCUMENTS

2002/0180266 A1* 12/2002 Hara ............... B60W 30/18109
903/918
2005/0159871 A1* 7/2005 Nakamura ............... B60K 6/52
303/121
(Continued)

FOREIGN PATENT DOCUMENTS

EP 3549811 A1 * 10/2019 ............. B60L 15/20
JP 2000166004 A 6/2000
(Continued)

OTHER PUBLICATIONS

EPO machine translation of JP 2008-043141 A (original JP document published Feb. 21, 2008) (Year: 2008).*
(Continued)

*Primary Examiner* — David A Testardi
(74) *Attorney, Agent, or Firm* — Young Basile Hanlon & MacFarlane, P.C.

(57) ABSTRACT

An electric vehicle control method for braking of an electric vehicle applies a front braking torque to a front drive motor that drives a front wheel and applies a rear braking torque to a rear drive motor that drives a rear wheel. The method includes: during the braking, executing a torque limiting process (process B, process C, front braking torque control) that reduces the front braking torque and the rear braking torque when a slip of the front wheel is detected; and executing a distribution torque changing process that increases the front braking torque while maintaining a sum of the front braking torque and the rear braking torque when a slip of the rear wheel is detected.

11 Claims, 11 Drawing Sheets

(51) Int. Cl.
*B60K 17/356* (2006.01)
*B60K 23/08* (2006.01)
*B60L 15/20* (2006.01)
*B60T 1/10* (2006.01)
*B60T 8/17* (2006.01)
*B60W 30/18* (2012.01)

(52) U.S. Cl.
CPC ...... *B60K 23/0808* (2013.01); *B60L 15/2009* (2013.01); *B60T 1/10* (2013.01); *B60T 8/1701* (2013.01); *B60W 30/18127* (2013.01); *B60L 2240/12* (2013.01); *B60L 2240/421* (2013.01); *B60L 2240/423* (2013.01); *B60L 2240/48* (2013.01); *B60L 2250/28* (2013.01); *B60T 2270/608* (2013.01)

(58) Field of Classification Search
CPC ...... B60T 2270/608; B60L 3/108; B60L 7/18; B60L 7/26; B60L 15/2009; B60L 2240/465; B60W 30/02; B60W 30/18127; B60W 30/18172; B60K 1/02; B60K 17/356; B60K 23/0808
See application file for complete search history.

(56) References Cited

U.S. PATENT DOCUMENTS

| | | | | |
|---|---|---|---|---|
| 2006/0055239 A1* | 3/2006 | Crombez | ................ | B60K 6/12 303/152 |
| 2007/0029874 A1* | 2/2007 | Finch | ................ | B60T 1/10 303/152 |
| 2007/0046099 A1* | 3/2007 | Matsuura | ................ | B60T 1/10 303/152 |
| 2007/0108838 A1* | 5/2007 | Shaffer | ................ | B60L 3/108 303/152 |
| 2008/0100132 A1* | 5/2008 | Jeon | ................ | B60L 7/18 303/152 |
| 2009/0051216 A1* | 2/2009 | Maeda | ................ | B60W 30/02 303/146 |
| 2009/0210128 A1* | 8/2009 | Fujimoto | ................ | B60T 8/175 701/84 |
| 2010/0113215 A1* | 5/2010 | Jager | ................ | B60W 30/18172 477/29 |
| 2010/0127562 A1* | 5/2010 | Yokoyama | ................ | B60T 1/10 303/151 |
| 2010/0312448 A1* | 12/2010 | Kueperkoch | ................ | B60T 8/173 701/82 |
| 2011/0130937 A1* | 6/2011 | Krueger | ................ | B60W 10/08 303/152 |
| 2012/0133202 A1* | 5/2012 | Mui | ................ | B60L 3/10 303/152 |
| 2013/0211644 A1 | 8/2013 | Yokoyama et al. | | |
| 2014/0074369 A1* | 3/2014 | Kim | ................ | B60L 7/26 701/70 |
| 2014/0195133 A1* | 7/2014 | Kato | ................ | B60W 20/00 701/78 |
| 2014/0231160 A1* | 8/2014 | Makino | ................ | B66F 9/07572 701/22 |
| 2015/0019058 A1* | 1/2015 | Georgiev | ................ | B60L 58/12 701/22 |
| 2016/0264111 A1* | 9/2016 | Doi | ................ | B60T 8/267 |
| 2019/0077258 A1* | 3/2019 | Cho | ................ | B60K 6/52 |
| 2019/0193577 A1* | 6/2019 | Kaneko | ................ | B60K 23/0808 |
| 2019/0291591 A1* | 9/2019 | Suzuki | ................ | B60L 3/104 |
| 2020/0070836 A1* | 3/2020 | Suzuki | ................ | B60L 15/20 |
| 2020/0353930 A1* | 11/2020 | Lee | ................ | B60W 10/188 |
| 2021/0107456 A1* | 4/2021 | Kim | ................ | B60L 3/108 |
| 2021/0170870 A1* | 6/2021 | Oh | ................ | B60K 17/356 |

FOREIGN PATENT DOCUMENTS

| | | | |
|---|---|---|---|
| JP | 2002058107 A | | 2/2002 |
| JP | 2006025485 A | * | 1/2006 |
| JP | 2008043141 A | * | 2/2008 |
| JP | 2009090774 A | * | 4/2009 |
| JP | 2010516556 A | | 5/2010 |
| JP | 2013163422 A | | 8/2013 |
| JP | 2017065299 A | | 4/2017 |
| JP | 2018019537 A | * | 2/2018 |
| JP | 2018019538 A | * | 2/2018 |

OTHER PUBLICATIONS

EPO machine translation of JP 2009-090774 A (original JP document published Apr. 30, 2009) (Year: 2009).*

* cited by examiner

ELECTRIC VEHICLE CONTROL METHOD AND ELECTRIC VEHICLE CONTROL SYSTEM

TECHNICAL FIELD

The present invention relates to an electric vehicle control method and an electric vehicle control system.

BACKGROUND ART

JP 2017-65299 A discloses a technique in which, when a slip occurs in one wheel during braking of an electric vehicle, a braking torque for the wheel is reduced, and the reduced braking torque is added to non-slipping wheels.

SUMMARY OF INVENTION

However, when the technique of JP 2017-65299 A is applied to, for example, an electric vehicle with front wheel steering, a braking torque of a rear wheel increases when a front wheel slips, resulting in unstable behavior in steering and the like. In addition, a braking torque of the front wheel increases when the rear wheel slips, which causes the electric vehicle to lean forward and gives unpleasant feeling to a driver.

Accordingly, an object of the present invention is to provide an electric vehicle control method and an electric vehicle control device that stabilize the behavior of an electric vehicle during braking and reduce unpleasant feeling.

According to one embodiment of the present invention, an electric vehicle control method for braking of an electric vehicle by applying a front braking torque to a front drive motor that drives a front wheel and applying a rear braking torque to a rear drive motor that drives a rear wheel is provided, the electric vehicle control method comprising: during the braking, executing a torque limiting process that reduces the front braking torque and the rear braking torque when a slip of the front wheel is detected; and executing a distribution torque changing process that increases the front braking torque while maintaining a sum of the front braking torque and the rear braking torque when a slip of the rear wheel is detected.

DESCRIPTION OF EMBODIMENTS

Hereinafter, embodiments of the present invention will be described.

<Configuration of Electric Vehicle System>

Figure 1:
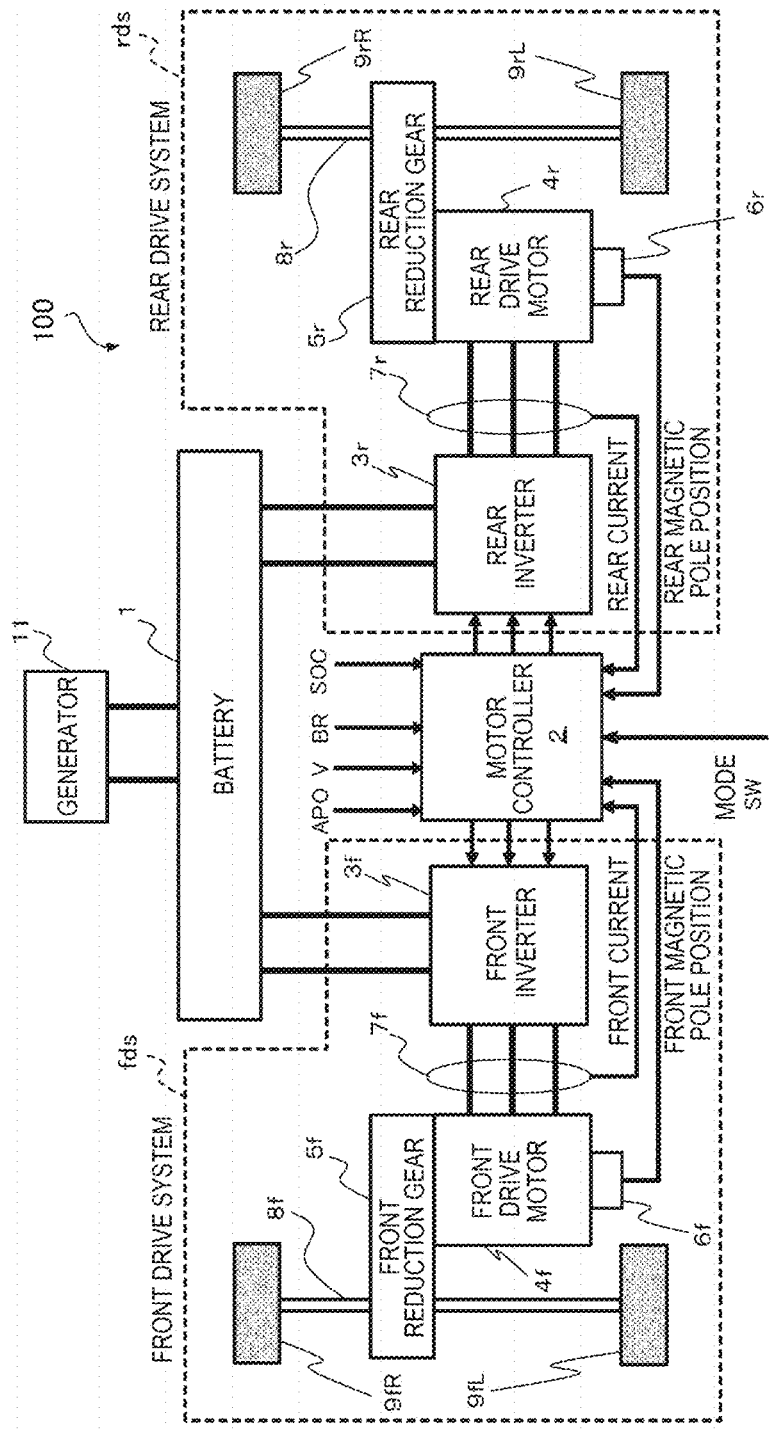
FIG. 1 is a block diagram illustrating a basic configuration of an electric vehicle system to which an electric vehicle control method according to the present embodiment is applied.

FIG. 1 is a block diagram illustrating a main configuration of an electric vehicle system 100 to which an electric vehicle control method (control system) according to the present embodiment is applied.

An electric vehicle in the present embodiment is an automobile that includes a drive motor 4 (electric motor) as a vehicle driving source and is capable of traveling by a driving force of the drive motor 4, and the electric vehicle includes an electric automobile and a hybrid automobile. In particular, the electric vehicle system 100 of the present embodiment applied to the electric vehicle includes two drive motors 4 (front drive motor 4f and rear drive motor 4r). Hereinafter, the configuration of the electric vehicle system 100 will be described in more detail.

As shown in FIG. 1, the electric vehicle system 100 includes a front drive system fds, a rear drive system rds, a battery 1, and a motor controller 2 (control unit).

The front drive system fds is provided with various sensors and actuators for controlling the front drive motor 4f that drives front drive wheels 9f (left front drive wheel 9fL and right front drive wheel 9fR) that are front wheels.

On the other hand, the rear drive system rds is provided with various sensors and actuators for controlling the rear drive motor 4r that drives rear drive wheels 9r (left rear drive wheel 9rL and right rear drive wheel 9rR) that are rear wheels.

The front drive system fds and the rear drive system rds are individually controlled by the motor controller 2.

The battery 1 functions as a power source that supplies (discharges) drive power to the drive motors 4 (front drive motor 4f and rear drive motor 4r), while it is connected to inverters 3 (front inverter 3f and rear inverter 3r) so as to be charged by receiving a supply of regenerative power from the drive motors 4 (front drive motor 4f and rear drive motor 4r).

A generator 11 is an engine or a fuel cell, and generates electric power and supplies the electric power to the battery 1 when SOC (charge amount) of the battery 1 is less than a predetermined lower limit value.

The motor controller 2 is, for example, a computer including a central processing unit (CPU), a read-only memory (ROM), a random access memory (RAM), and an input/output interface (I/O interface). The motor controller 2 constitutes a control device of the electric vehicle according to the present invention, and is a component including a program for executing a control method for the electric vehicle according to the present invention.

The motor controller 2 receives, as digital signals, signals of various vehicle variables indicating vehicle states of accelerator position APO, a vehicle speed V, an operation amount of a brake pedal of a friction brake (brake operation amount BR), rotor phases α (front rotor phase αf and rear rotor phase αr) of the drive motors 4, and currents Im (front motor current Imf and rear motor current Imr) of the drive motors 4. In addition, the motor controller 2 receives a signal from a mode switch that determines a traveling mode of the electric vehicle based on an operation of a driver. The traveling mode includes an accelerator mode in which almost no braking torque is generated even when an accelerator operation is canceled, and a one-pedal mode in which the electric vehicle can be stopped by generating a regenerative torque (regenerative current) that is a strong braking torque when the accelerator operation is canceled.

The motor controller 2 generates a PWM signal for controlling each of the drive motors 4 based on a received signal. A drive signal for each of the inverters 3 is generated according to each of the generated PWM signals.

The motor controller 2 receives SOC information from the battery 1, starts the generator 11 when the SOC is less than the predetermined lower limit value, and stops the generator 11 when the SOC reaches a predetermined upper limit value.

Each of the inverters 3 includes two switching elements (for example, power semiconductor elements such as IGBTs and MOS-FETs) provided corresponding to the respective phases. In particular, the inverter 3 turns on/off the switching elements in response to a command from the motor controller 2, thereby converting or inversely converting a direct current supplied from the battery 1 into an alternating current, and adjusting a current supplied to the drive motor 4 to a desired value.

Each of the drive motors 4 is configured as a three-phase AC motor. Each of the drive motors 4 (front drive motor 4f and rear drive motor 4r) generates a driving force by an alternating current supplied from the corresponding inverter 3 (front inverter 3f and rear inverter 3r), and transmits the driving force to the drive wheels 9 (front drive wheels 9f and rear drive wheels 9r) via a corresponding reduction gear 5 (front reduction gear 5f and rear reduction gear 5r) and a drive shaft 8 (front drive shaft 8f and rear drive shaft 8r).

The drive motor 4 recovers kinetic energy of the electric vehicle as electric energy by generating regenerative power when the drive motor 4 rotates together with the drive wheels 9 during traveling of the electric vehicle. In this case, the inverter 3 converts an alternating current (regenerative power) generated during a regenerative operation into a direct current and supplies the direct current to the battery 1.

Rotation sensors 6 (front rotation sensor 6f and rear rotation sensor 6r), which are angular velocity detection units (executing angular velocity detection step), detect the rotor phases α (front rotor phase of and rear rotor phase GO of the drive motors 4, respectively, and output the rotor phases α to the motor controller 2. The rotation sensor 6 includes, for example, a resolver, an encoder, or the like.

Current sensors 7 (front current sensor 7f and rear current sensor 7r) detect three-phase alternating currents (iu, iv, and iw) flowing through the respective drive motors 4. Since the sum of the three-phase alternating currents (iu, iv, and iw) is zero, currents of any two phases may be detected by the current sensor 7, and a current of the remaining one phase may be obtained by calculation. In particular, the current sensor 7 detect three-phase alternating currents (iu$_f$, iv$_f$, and iw$_f$) which are currents flowing through the front drive motor 4f and three-phase alternating currents (iu$_r$, iv$_r$, and iw$_r$) which are currents flowing through the rear drive motor 4r.

Figure 2:
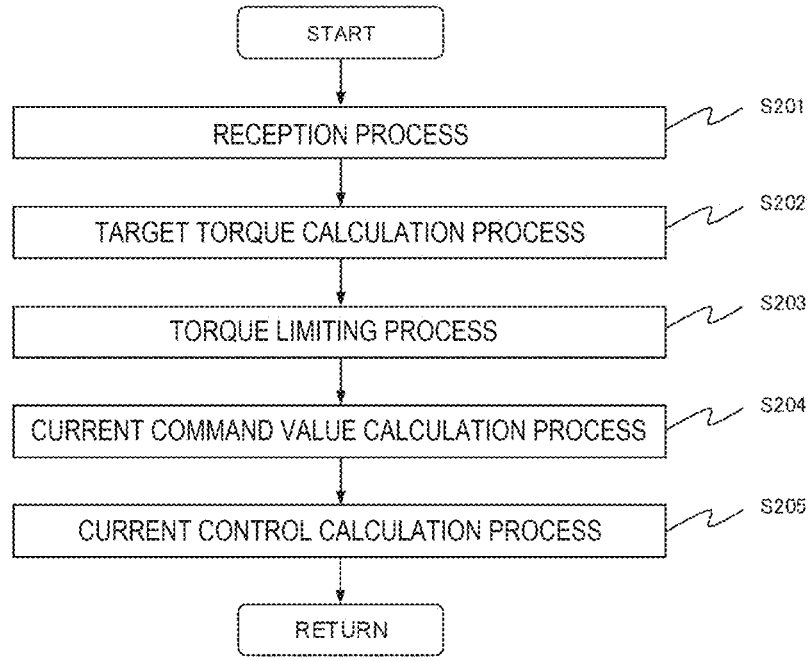
FIG. 2 is a flowchart illustrating main processes of drive control of an electric vehicle.

FIG. 2 is a flowchart illustrating a basic process in the control device of the electric vehicle by the motor controller 2 of the present embodiment. The motor controller 2 is programmed to execute processes from step S201 to step S205 shown in FIG. 2 at a predetermined calculation cycle.

In step S201, the motor controller 2 performs a reception process of acquiring various parameters used for executing processes of step S202 and subsequent steps according to the following processes 1 to 3.

1. Detection Value of Each Sensor

The motor controller 2 acquires the accelerator position APO (%), the brake operation amount BR, the rotor phase α [rad], the three-phase alternating currents (iu, iv, and iw) [A] flowing through the drive motor 4, and a direct current voltage value Vdc [V] of the battery 1 from an accelerator position sensor (not shown) and the above sensors. In addition, the motor controller 2 acquires a mode switch signal.

2. Previous Value of Motor Torque Command Value

The motor controller 2 acquires previous values of motor torque command values (front motor torque command value Tmf and rear motor torque command value Tmr), which will be described later, stored in an internal memory.

3. Control Parameter Obtained by Calculation

The motor controller 2 calculates, based on the respective parameters acquired according to the above "1.", a motor electric angular velocity $\omega_e$ [rad/s], a motor rotation speed $\omega_m$ [rad/s], a motor rotation speed $N_m$ [rpm], and a wheel speed $\omega_w$ [km/h].

(i) Motor Electric Angular Velocity $\omega_e$

The motor controller 2 time-differentiates the rotor phase α (front rotor phase of and rear rotor phase $\alpha_r$) to obtain the motor electric angular velocity $\omega_e$ (front motor electric angular velocity $\omega_{ef}$ and rear motor electric angular velocity $\omega_{er}$).

(ii) Motor Rotation Speed $\omega_m$

The motor controller 2 calculates the motor rotation speed $\omega_m$ (front motor rotation speed $\omega_{mf}$ and rear motor rotation speed $\omega_{mr}$), which is a mechanical angular velocity of the drive motor 4, by dividing the motor electric angular velocity $\omega_e$ by the number of pole pairs of the drive motor 4. A relation between the motor rotation speed $\omega_m$ and a rotation speed of the drive shaft 8 as a drive shaft is appropriately determined according to a gear ratio of the reduction gear 5. That is, the motor rotation speed $\omega_m$ is a speed parameter correlated with the rotation speed of the drive shaft 8.

(iii) Motor Rotation Speed Nm

The motor controller 2 calculates the motor rotation speed $N_m$ (front motor rotation speed $N_{mf}$ and rear motor rotation speed $N_{mr}$) by multiplying the motor rotation speed $\omega_m$ by a unit conversion coefficient (60/2π).

(iv) Wheel Speed $\omega_w$

First, the motor controller 2 multiplies the front motor rotation speed $\omega_{mf}$ by a tire dynamic radius R, and calculates, based on a value obtained by the multiplication and a gear ratio of the front reduction gear 5f, a left front motor rotation speed $\omega_{wfL}$ and a right front motor rotation speed $\omega_{wfR}$. The motor controller 2 multiplies the rear motor rotation speed $\omega_{mr}$ by the tire dynamic radius R, and calculates, based on a value obtained by the multiplication and a gear ratio of a final gear of the rear reduction gear 5r, a left rear motor rotation speed $\omega_{wrL}$ and a right rear motor rotation speed $\omega_{wrR}$. In the present embodiment, a unit conversion coefficient (3600/1000) is applied to the wheel speed w thus obtained, and a unit [m/s] of the wheel speed $\omega_w$ is converted into [km/h]. The left front motor rotation speed $\omega_{wfL}$, the right front motor rotation speed $\omega_{wfR}$, the left rear motor rotation speed $\omega_{wrL}$, and the right rear motor rotation speed $\omega_{wrR}$ may be directly detected by sensors, respectively.

The vehicle speed V is obtained from a sensor such as a GPS, or, for example, is calculated as described above based on a wheel speed by selecting a lower rotation speed of the rotation speeds ($\omega_{mf}$ and $\omega_{mr}$) during acceleration, selecting a higher rotation speed of the rotation speeds ($\omega_{mf}$ and $\omega_{mr}$) during deceleration, or selecting either one of the rotation speeds ($\omega_{mf}$ and $\omega_{mr}$) when the electric vehicle is traveling at a substantially constant speed.

Figure 3:
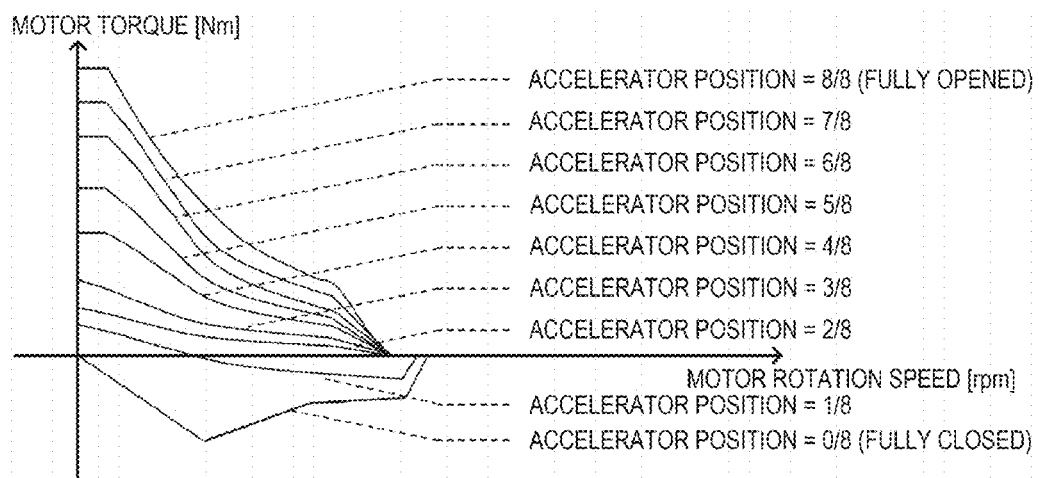
FIG. 3 is a diagram showing an example of an accelerator position (accelerator opening degree)—torque table in an accelerator mode.
Figure 4:
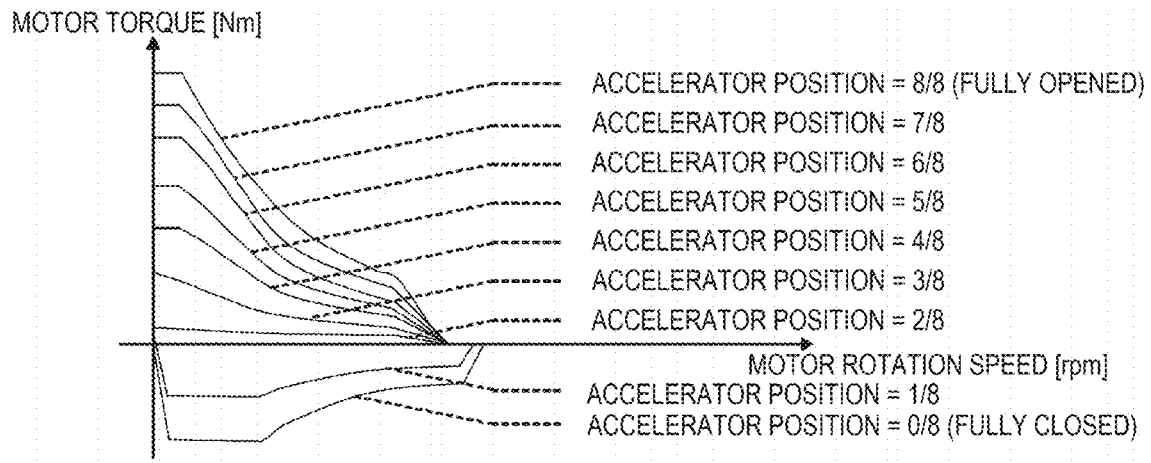
FIG. 4 is a diagram showing an example of an accelerator position-torque table in a one-pedal mode.

FIG. 3 is a diagram showing an example of an accelerator position-torque table in the accelerator mode. FIG. 4 is a diagram showing an example of an accelerator position-torque table in the one-pedal mode.

In a motor torque calculation process of step S202, the motor controller 2 sets a total torque target value Tm1. Specifically, when a driver selects the accelerator mode as the traveling mode of the electric vehicle, the total torque target value Tm1 is set by referring to the accelerator position APO-torque table shown in FIG. 3, which represents one aspect of driving force characteristics of the accelerator mode calculated according to the accelerator position APO and the motor rotation speed ωm received in step S201.

When the driver selects the one-pedal mode as the traveling mode of the electric vehicle, the total torque target value Tm1 is set by referring to the accelerator position APO-torque table shown in FIG. 4, which represents one aspect of driving force characteristic of the one-pedal mode calculated according to the accelerator position APO and the motor rotation speed ωm received in step S201. As shown in FIG. 4, for example, when the accelerator position APO is set to ⅛, it can be seen that motor torques become negative for almost all the motor rotation speeds (vehicle speed V), and a braking torque accompanied by a regenerative current is generated.

In step S203, the motor controller 2 executes a torque limiting process. Details of the torque limiting process will be described later.

In step S204, the motor controller 2 executes a current command value calculation process. Specifically, the motor controller 2 calculates a dq-axis current target value ($i_d^*$, $i_q^*$) with reference to a predetermined table based on the front motor torque command value Tmf (or front motor torque command value Tmf), the rear motor torque command value Tmr, the front motor rotation speed $\omega_{mf}$ and the rear motor rotation speed $\omega_{mr}$ calculated in step S203, and the direct current voltage value Vdc acquired in step S201. In particular, the motor controller 2 calculates a front dq-axis current target value ($i_{df}^*$, $i_{qf}^*$), which is a dq-axis current target value ($i_d^*$, $i_q^*$) set for the front drive motor 4f, and a rear dq-axis current target value ($i_{dr}^*$, $i_{qr}^*$), which is a dq-axis current target value ($i_d^*$, $i_q^*$) set for the rear drive motor 4r.

In step S205, the motor controller 2 executes a current control calculation process. Specifically, the motor controller 2 first calculates a dq-axis current value ($i_d$, $i_q$) based on values of the three-phase alternating currents (iu, iv, and iw) and the rotor phase α acquired in step S201. Next, the motor controller 2 calculates a dq-axis voltage command value ($v_d$, $v_q$) based on a deviation between the dq-axis current value ($i_d$, $i_q$) and the dq-axis current target value ($i_d^*$, $i_q^*$) obtained in step S204. In particular, the motor controller 2 calculates a front dq-axis voltage command value ($v_{df}$, $v_{qf}$) which is a dq-axis voltage command value ($v_d$, $v_q$) set for the front drive motor 4f and a rear dq-axis voltage command value ($v_{dr}$, $v_{qr}$) which is a dq-axis voltage command value ($v_d$, $v_q$) set for the rear drive motor 4r.

Further, the motor controller 2 calculates three-phase alternating voltage command values (vu, vv, and vw) based on the dq-axis voltage command value ($v_d$, $v_q$) and the rotor phase α. In particular, the motor controller 2 calculates front three-phase alternating voltage command values ($vu_f$, $vv_f$, and $vw_f$), which are three-phase alternating voltage command values (vu, vv, and vw) set for the front drive motor 4f, and rear three-phase alternating voltage command values ($vu_f$, $vv_f$, and $vw_f$), which are three-phase alternating voltage command values (vu, vv, and vw) set for the rear drive motor 4r.

Then, the motor controller 2 obtains a PWM signal (tu, tv, and tw) [%] based on the calculated three-phase alternating voltage command values (vu, vv, and vw) and the direct current voltage value Vdc. By turning on and off the switching elements of the inverter 3 by the PWM signal (tu, tv, and tw) thus obtained, the drive motor 4 (the front drive motor 4f, the rear drive motor 4r) can be driven with a desired torque instructed by a total torque command value (front motor torque command value Tmf and rear motor torque command value Tmr).

<Torque Limiting Process>

Hereinafter, the torque limiting process shown in step S203 of FIG. 2 will be described in detail. As described above, the motor controller 2 transmits the front motor torque command value Tmf to the front inverter 3f via the PWM signal, and transmits the rear motor torque command value Tmr to the rear inverter 3r via the PWM signal.

On the other hand, in the electric vehicle system 100 of the present embodiment, when the one-pedal mode is selected, the front motor torque command value Tmf can be functioned as a front braking torque by the accelerator operation and the rear motor torque command value Tmr can be functioned as a rear braking torque by the accelerator operation.

Incidentally, when the front braking torque is applied to the front wheel (front drive wheels 90 and the rear braking torque is applied to the rear wheel (rear drive wheels 9r), a slip occurs in the front wheel or the rear wheel, and the slip may occur significantly particularly in the one-pedal mode.

On the other hand, distribution torques (for example, 7:3) to the front wheel and the rear wheel are set in advance such that a relation between a steering operation and the actual steering of the electric vehicle is appropriate. In an electric vehicle, the front wheel is generally steered.

Therefore, for example, in a case where a slip is detected in the front wheel, if the distribution torque to the rear wheel is increased as in JP 2017-65299 A described above, steering characteristics of the electric vehicle tends to be oversteer, and if the steering is operated in a state where the vehicle speed V is high, the electric vehicle may spin.

Conversely, when a slip is detected in the rear wheel, it is also possible to eliminate the slip by making a braking torque of the rear wheel zero, that is, by making the rear wheel substantially a driven wheel. However, in this case, since all braking torques are applied to the front wheel, the center of gravity of the electric vehicle moves forward and a pitch angle of the electric vehicle tilts forward, which gives a driver unpleasant feeling.

Therefore, in the present invention, in order to stabilize the behavior of the electric vehicle at the time of braking, as described below, the torque limiting process is executed on the front drive motor 4*f* and the rear drive motor 4*r*.

<Flow of Torque Limiting Process>

Figure 5:
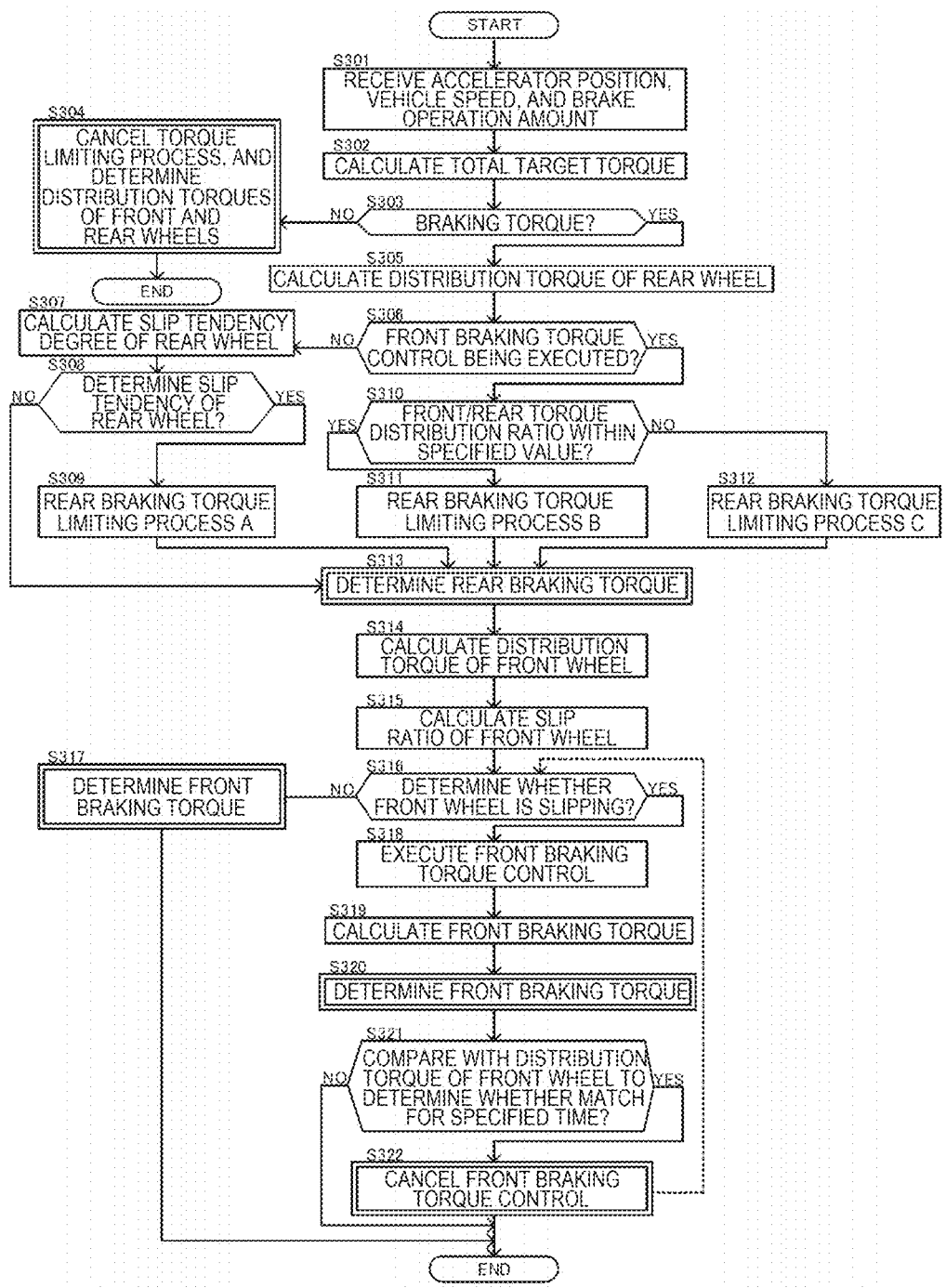
FIG. 5 is a flowchart illustrating a torque limiting process.
Figure 6:
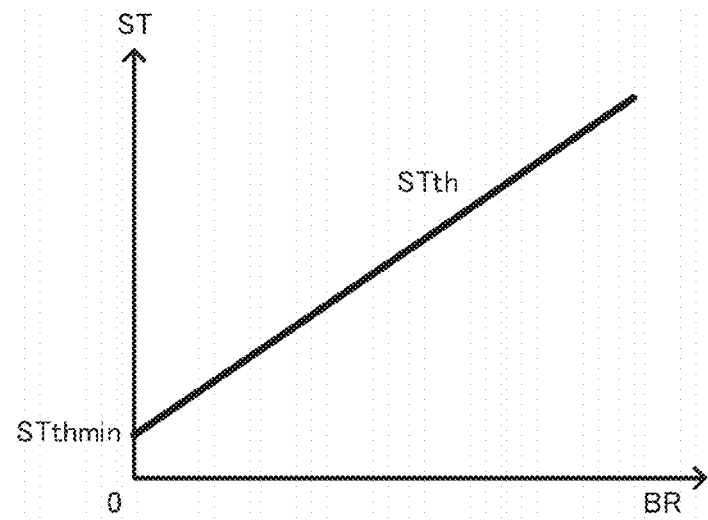
FIG. 6 is a map showing a relation between a brake operation amount and a threshold of a slip tendency degree of a rear wheel.
Figure 7:
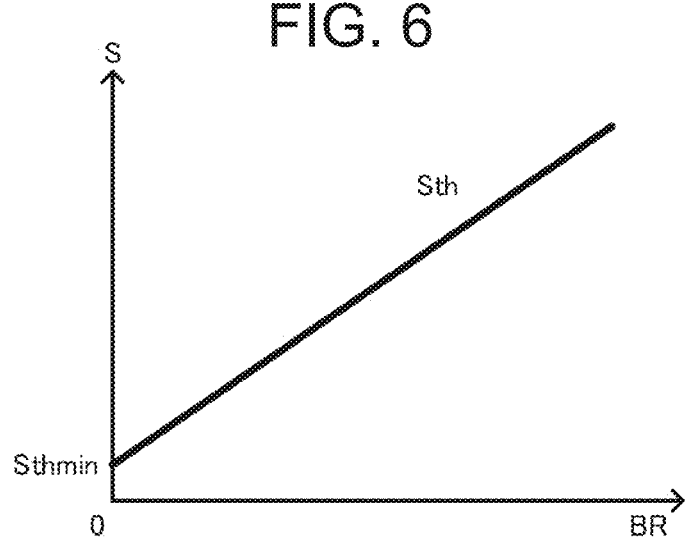
FIG. 7 is a map showing a relation between a brake operation amount and a threshold of a slip ratio of a front wheel.
Figure 8:
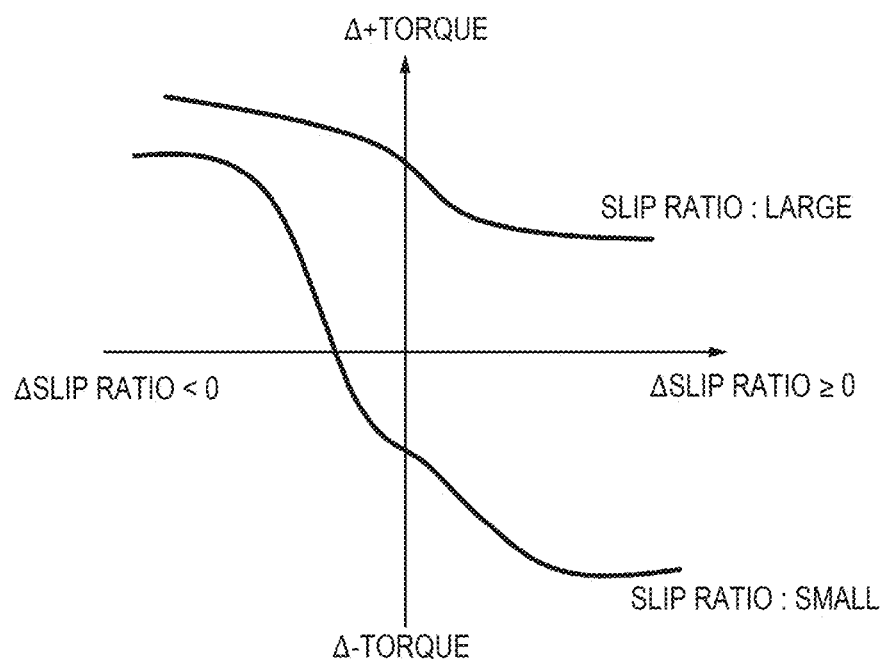
FIG. 8 is a map for performing front braking torque control based on the slip ratio and a slip change rate.

FIG. 5 is a flowchart illustrating the torque limiting process. FIG. 6 is a map showing a relation between the brake operation amount BR and a threshold of a slip tendency degree ST of the rear wheel. FIG. 7 is a map showing a relation between the brake operation amount BR and a threshold of a slip ratio S of the front wheel. FIG. 8 is a map for performing a front braking torque control based on the slip ratio S and a change amount in the slip ratio S (A slip ratio).

In step S301, the motor controller 2 receives the accelerator position APO, the vehicle speed V, and the brake operation amount BR, and in step S302, the motor controller 2 calculates the total torque target value Tm1. Step S301 is included in step S201, and step S302 is included in step S202.

In step S303, the motor controller 2 determines whether the total torque target value Tm1 is the braking torque. If NO, the process proceeds to step S304, and if YES, the process proceeds to step S305. Whether the total torque target value Tm1 is the braking torque is determined, for example, by comparing the information of the accelerator position and the motor rotation speed with the map of FIG. 3 or FIG. 4, or by determining whether the front current sensor 7*f* or the rear current sensor 7*r* detects a regenerative current. In particular, when the one-pedal mode is selected as the traveling mode, the braking torque is significantly generated.

In step S304, the motor controller 2 determines that the total torque target value Tm1 is the driving torque, and if the front braking torque control or rear braking torque limiting processes (A, B, and C), which will be described later, are being executed, the motor controller 2 cancels all of these processes. Then, the motor controller 2 multiplies, for example, the total torque target value Tm1 by front and rear driving force distribution gains Kf (0≤Kf (for example, 0.7)≤1) and (1-Kf) (for example, 0.3) to obtain the front motor torque command value Tmf and the rear motor torque command value Tmr, thereby determining a distribution torque of the front wheel and a distribution torque of the rear wheel, and uses these values in step S204.

In step S305, the motor controller 2 determines that the total torque target value Tm1 is the braking torque, and calculates the rear motor torque command value Tmr (rear braking torque) by multiplying the total torque target value Tm1 by (1-Kf).

In step S306, the motor controller 2 determines whether the front braking torque control, which will be described later, is being executed. If NO, the process proceeds to step S307, and if YES, the process proceeds to step S310.

In step S307, the motor controller 2 calculates the slip tendency degree ST of the rear wheel. Here, the slip tendency degree ST of the rear wheel is calculated as a ratio of a change amount in a rotation speed of the rear drive motor 4*r* to the rear braking torque (change amount in rotation speed of rear drive motor 4*r*/rear braking torque). A magnitude of the rear braking torque is calculated based on a value of the rear motor torque command value Tmr or a magnitude of a regenerative current detected by the rear current sensor 7*r*. The change amount in the rotation speed of the rear drive motor 4*r* is calculated by subtracting, from the calculated rear motor rotation speed $\omega_{mr}$, a rotation speed (corresponding to a latest past rotation speed) obtained through a low-pass filter, which is the rear motor rotation speed $\omega_{mr}$. The slip tendency degree ST of the rear wheel may be calculated as the change amount/the rear braking torque by directly detecting the rotation speed of the rear drive motor 4*r* with a sensor and using a change amount in the rotation speed. In addition, the slip tendency degree ST of the rear wheel may be calculated as a slip ratio/a rear braking torque by calculating a wheel speed based on wheel speed pulse information of left and right rear wheels detected by an ABS controller (motor controller 2) that executes ABS control described later and using an average slip ratio of the left and right rear wheels.

In step S308, the motor controller 2 determines whether the slip tendency degree ST of the rear wheel exceeds a threshold STth with reference to the map of FIG. 6. If NO, the process proceeds to step S313, and if YES, the process proceeds to step S309.

Here, FIG. 6 is a map for making it more difficult to execute the control of step S309, which will be described later, as the brake operation amount BR of a driver increases, and for preferentially executing the braking by a brake operation. Here, when the brake operation is not performed, the brake operation amount BR is zero, and the threshold STth is the minimum value STthmin, but the threshold STth monotonically increases as the brake operation amount BR increases. When the motor controller 2 detects a slip of a rear wheel (or front wheel) during the brake operation, the motor controller 2 executes an anti-lock brake system (ABS) control.

In step S309, the motor controller 2 executes the rear braking torque limiting process A (hereinafter, referred to as process A), which is a distribution torque changing process. Here, in a state where a total braking torque (total torque target value Tm1) to be applied to the electric vehicle is constant, a distribution torque (rear braking torque) to the rear drive motor 4*r* is decreased, and a distribution torque (front braking torque) to the front drive motor is increased by that amount.

Specifically, for example, by changing the driving force distribution gain Kf from 0.6 to 0.8, the distribution torques between the front wheel and the rear wheel are changed from 0.6:0.4 to 0.8:0.2. Alternatively, a first torque correction value for obtaining a front braking torque at which no slip occurs in the rear wheel may be prepared in advance, the first torque correction value may be added to the rear motor torque command value Tmr, and the first torque correction value may be subtracted from the front motor torque command value Tmf. However, as the front wheel may suddenly slip if the front braking torque is changed stepwise, the control is performed such that the distribution torque after change is obtained with a predetermined time constant. After executing step S309, the motor controller 2 proceeds to step S313.

As described above, when the motor controller 2 determines YES in step S306, the motor controller 2 proceeds to step S310.

Then, in step S310, the motor controller 2 determines whether the distribution torques between the front wheel and the rear wheel are within a specified value. If YES, the process proceeds to step S311, and if NO, the process proceeds to step S312.

Here, the specified value specifies a maximum value of the distribution torque of the rear wheel, and for example, the distribution torques of the front wheel and the rear wheel are 0.7:0.3. When the distribution torque of the rear wheel exceeds the specified value (for example, 0.3), the steering characteristics of the electric vehicle becomes oversteer, and when the steering operation is performed during braking of the electric vehicle, the electric vehicle may spin. Therefore, in order to avoid this, the specified value is set as an upper limit of the distribution torque of the rear wheel.

In step S311, the motor controller 2 executes the rear braking torque limiting process B (hereinafter, referred to as process B). Here, it is determined as YES in step S312 which will be described later, that is, it is determined that the front wheel runs onto a road surface having a small friction resistance by detecting a slip of the front wheel. Based on the determination, the rear braking torque to be applied to the rear drive motor 4r is reduced in advance (in feedforward manner) to avoid the slip of the rear wheel. In particular, when the process A of step S309 is executed, the distribution torque of the front wheel increases, and thus it is highly likely to detect the slip of the front wheel. Therefore, it is highly likely that step S311 is executed after step S309 is executed.

The process B is different from the process A in that a second torque correction value that is a rear braking torque (negative torque) at which no slip occurs in the rear wheel is prepared in advance, and the second torque correction value is added to the rear motor torque command value Tmr. By this process, since the rear braking torque to be applied to the rear drive motor 4r before the rear wheel runs onto the road surface causing the slip of the front wheel can be reduced, the slip of the rear wheel can be prevented in advance. After executing step S311, the motor controller 2 proceeds to step S313.

In step S312, the motor controller 2 executes the rear braking torque limiting process C (hereinafter, referred to as process C). When the distribution torque of the rear wheel exceeds the above specified value due to step S320 which will be described later, the process C limits the rear braking torque to be applied to the rear drive motor 4r such that the distribution torque of the rear wheel does not exceed the specified value, and controls the rear motor torque command value Tmr such that a distribution torque with respect to the front motor torque command value Tmf determined in step S319, which will be described later, becomes the specified value (or becomes smaller than specified value).

As a result, the steering characteristics of the electric vehicle can be prevented from becoming oversteer. Even if the process C (the same applies to process A and process B) is executed, the rear braking torque (rear motor torque command value Tmr) does not become zero. Therefore, by maintaining a constant distribution ratio for the braking torques of the front wheel and the rear wheel, a change in the pitch angle of the electric vehicle can be prevented, and a driver does not have unpleasant feeling. After executing step S312, the motor controller 2 proceeds to step S313.

In step S313, the motor controller 2 determines the rear motor torque command value Tmr calculated in step S308 (NO), step S309, step S311, and step S312 as the rear braking torque to be applied to the rear drive motor 4r (rear wheel), and uses this value in step S204 (FIG. 2).

In step S314, the motor controller 2 calculates the front motor torque command value Tmf (front braking torque) as a front wheel distribution torque by multiplying the total torque target value Tm1 obtained in step S302 by the driving force distribution gain Kf (initial value). However, when the process A of step S309 is executed, the front motor torque command value Tmf is calculated based on the distribution torque in the process A.

In step S315, the motor controller 2 calculates the slip ratio S of the front wheel. Here, the slip ratio S of the front wheel is calculated according to (rotation speed of rear wheel—rotation speed of front wheel)/(rotation speed of rear wheel) on the assumption that the rear wheel is not slipping.

In step S316, the motor controller 2 determines whether the slip ratio S of the front wheel exceeds a threshold Sth with reference to the map of FIG. 7. If NO, the process proceeds to step S317, and if YES, the process proceeds to step S318.

Here, FIG. 7 is a map for making it more difficult to execute the control of step S318, which will be described later, as the brake operation amount BR of a driver increases, and for preferentially executing the braking by a brake operation. Here, when the brake operation is not performed, the brake operation amount BR is zero, and the threshold Sth is the minimum value Sthmin, but the threshold Sth monotonically increases as the brake operation amount BR increases.

In step S317, the motor controller 2 determines the front motor torque command value Tmf calculated in step S314 as the front braking torque to be applied to the front drive motor 4f (front wheel), and uses this value in step S204 (FIG. 2).

In step S318, the motor controller 2 executes the front braking torque control for preventing slip of the front wheel. The motor controller 2 calculates the Δ slip ratio (change amount in slip ratio S) based on a difference between a current slip ratio S calculated in step S315 and a value (corresponding to latest past slip ratio S) obtained through a low-pass filter as the slip ratio S. Here, when the Δ slip ratio is positive, it means that the slip of the front wheel tends to decrease, and when the Δ slip ratio is negative, it means that the slip of the front wheel tends to increase.

Then, the motor controller 2 refers to the map of FIG. 8, and calculates, based on the slip ratio S and the Δ slip ratio, addition torques (Δ+, Δ−) to be added to the previous value of the front motor torque command value Tmf (front braking torque) in the next step S319 such that the Δ slip ratio of the front wheel becomes zero or a positive value (such that the slip is eliminated).

Here, the value of the front motor torque command value Tmf (front braking torque) is updated by using the front motor torque command value Tmf (front braking torque) calculated in step S314 as an initial value and adding the addition torque (Δ+) or the addition torque (Δ−) as needed.

The addition torque (Δ+) increases the front motor torque command value Tmf and decreases the braking torque of the front wheel.

The addition torque (Δ−) decreases the front motor torque command value Tmf and increases the braking torque of the front wheel.

In step S319, the motor controller 2 calculates (updates) the front motor torque command value Tmf by adding the addition torque (Δ+) or the addition torque (Δ−) calculated in step S318 to the previous value of the front motor torque command value Tmf.

In step S320, the motor controller 2 determines the updated front motor torque command value Tmf as the front braking torque to be applied to the front drive motor 4f (front wheel), and uses this value in step S204 (FIG. 2).

In step S321, the motor controller 2 compares a current value of the front motor torque command value Tmf with the front motor torque command value Tmf calculated in step S314, and determines whether the front motor torque command value Tmf matches the front motor torque command value Tmf (front wheel distribution torque) for a specified time. If YES, the process proceeds to step S322, and if NO, the process proceeds to step S204 (FIG. 2).

In step S322, the motor controller 2 determines that an increasing tendency of the slip ratio S of the front wheel is eliminated and an original front braking torque (front braking torque related to one-pedal control) can be applied to the front drive motor 4f, cancels the front braking torque control, and proceeds to step S204 (FIG. 2). As a result, regardless of the slip ratio S, for example, the determination in step S316 is set to NO until the next braking torque is applied to the front wheel and the rear wheel.

Even if any of the process A, the process B, and the process C is performed, the rear braking torque to be applied to the rear drive motor 4r does not become zero.

<Time Chart of Process A>

Figure 9:
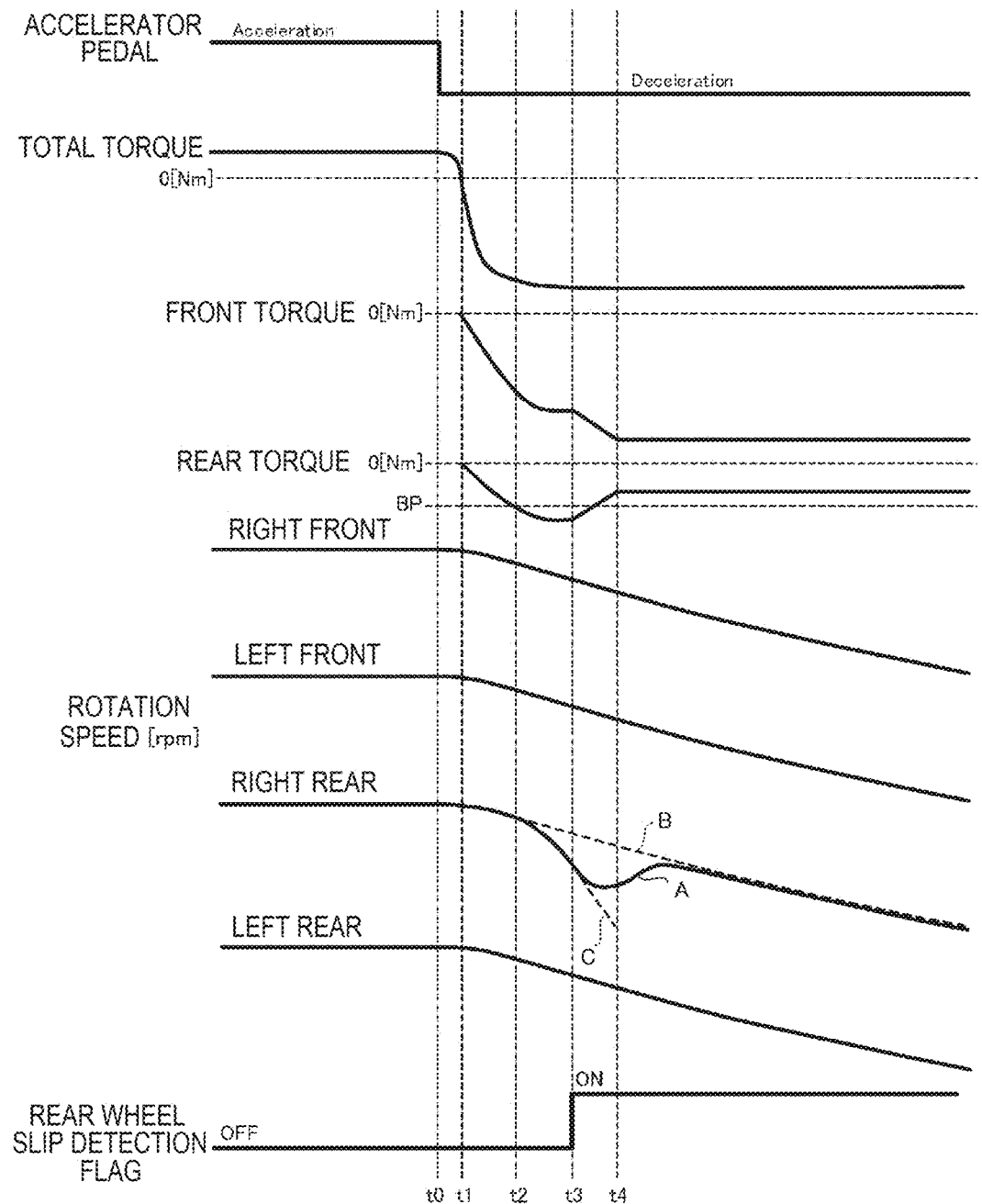
FIG. 9 is a time chart when a rear braking torque limiting process A is executed.

FIG. 9 is a time chart when the process A is executed. Here, FIG. 9 shows a time chart of a total torque (front torque and rear torque) and rotation speeds of the drive wheels 9 (right front drive wheel, left front drive wheel, right rear drive wheel, and left rear drive wheel) in a case where a driver selects the one-pedal mode as the traveling mode, and a slip is detected in a rear wheel (for example, right rear drive wheel) when the driver releases an accelerator pedal after depressing the accelerator pedal with a predetermined accelerator position on a wet road surface with reduced friction force, for example.

Here, when the front torque is positive, it is a front driving torque for accelerating the electric vehicle, and when the front torque is negative, it is the front braking torque for braking (deceleration) of the electric vehicle. Similarly, when the rear torque is positive, it is a rear driving torque for accelerating the electric vehicle, and when the rear torque is negative, it is the rear braking torque for braking (deceleration) of the electric vehicle.

As shown in FIG. 9, before time t0, the driver depresses the accelerator pedal at a predetermined accelerator position (acceleration), and the total torque is also a driving torque (positive torque) for moving (accelerating) the electric vehicle forward. At this time, front wheels (right front drive wheel and left front drive wheel) and rear wheels (right rear drive wheel and left rear drive wheel) maintain a predetermined rotation speed, and the electric vehicle travels at a substantially constant speed.

At time t0, when the driver releases the accelerator pedal (deceleration), the total torque starts to decrease and becomes zero at time t1, and thereafter, the total torque becomes a braking torque (negative torque) for decelerating the electric vehicle. Between time t0 to time t1, the rotation speed of the drive wheel 9 hardly decreases.

At time t1, when the motor controller 2 determines that the total torque has shifted to the braking torque (YES in step S303 in FIG. 5), the motor controller 2 distributes the total torque to the front torque (front braking torque) of the front wheel and the rear torque (rear braking torque) of the rear wheel at a predetermined distribution (for example, 7:3) (step S305 in FIG. 5). At this time, the rotation speed of the drive wheel 9 also starts to gradually decrease.

Here, it is assumed that the determination in S306 of FIG. 5 is NO, and the process B of step S311 and the process C of step S312 are not performed. Before the process A, the process B, the process C, and the front braking torque control are executed, the front braking torque (convergence value) and the rear braking torque (convergence value) are controlled by one-pedal control using an accelerator operation amount (accelerator position APO) or the like as a received value.

At time t2, when the rear torque (rear braking torque) is lower than a predetermined value (BP) (braking torque corresponding to maximum friction force of road surface), for example, a slip occurs in the right rear drive wheel 9. That is, a slope of a curve indicating a decrease in the rotation speed of the right rear drive wheel starts to become larger than a slope of a curve indicating a decrease in the rotation speed of another drive wheel 9.

At time t3, the motor controller 2 determines that the slip tendency degree ST of the right rear drive wheel 9 exceeds the threshold STthmin (STth when the driver is depressing the brake pedal), and turns on a rear wheel slip detection flag. As a result, the determination in step S308 of FIG. 5 becomes YES.

Then, the motor controller 2 executes the process A of step S309 of FIG. 5. As a result, the distribution torques between the front wheel and the rear wheel are changed from 0.6:0.4 to 0.8:0.2, for example, and in step S313, the rear braking torque to be applied to the rear drive motor 4r is determined based on the changed distribution torque of the rear wheel. On the condition that no slip occurs in the front wheel, in step S317, the front braking torque to be applied to the front drive motor 4f is determined based on the changed distribution torque. Therefore, the rear braking torque decreases monotonously and the front braking torque increases monotonously from time t3 to time t4, and between time t3 to time t4, the distribution torques between the front wheel and the rear wheel are changed from 7:3 to 8:2, for example.

The rear torque (rear braking torque) determined by the process A of step S309 in FIG. 5 is set to a braking torque that does not cause a slip on the rear wheel even on a road surface where a friction force is reduced due to flooding as described above. Therefore, by executing the process A of step S309 of FIG. 5, the rotation speed of the right rear drive wheel 9 converges to the rotation speed of another drive wheel 9, and the slip is eliminated.

Among curves representing the rotation speed of the right rear drive wheel in FIG. 9, a curve B (broken line) represents the rotation speed when no slip occurs in the right rear drive wheel. On the other hand, even if the process A is executed, the total torque does not change. Therefore, a curve A (solid line) representing the rotation speed of the right rear drive wheel 9 converges to the curve B after the time t3. In addition, the behavior of the drive wheel 9 in which no slip occurs after the time t3 does not change even if the process A is executed.

When the determination in step S308 in FIG. 5 is still NO at the time t3, the rotation speed of the right rear drive wheel 9 rapidly decreases thereafter as shown by a curve C (broken line), and the rotation is finally locked.

<Time Chart of Process B and Front Braking Torque Control>

Figure 10:
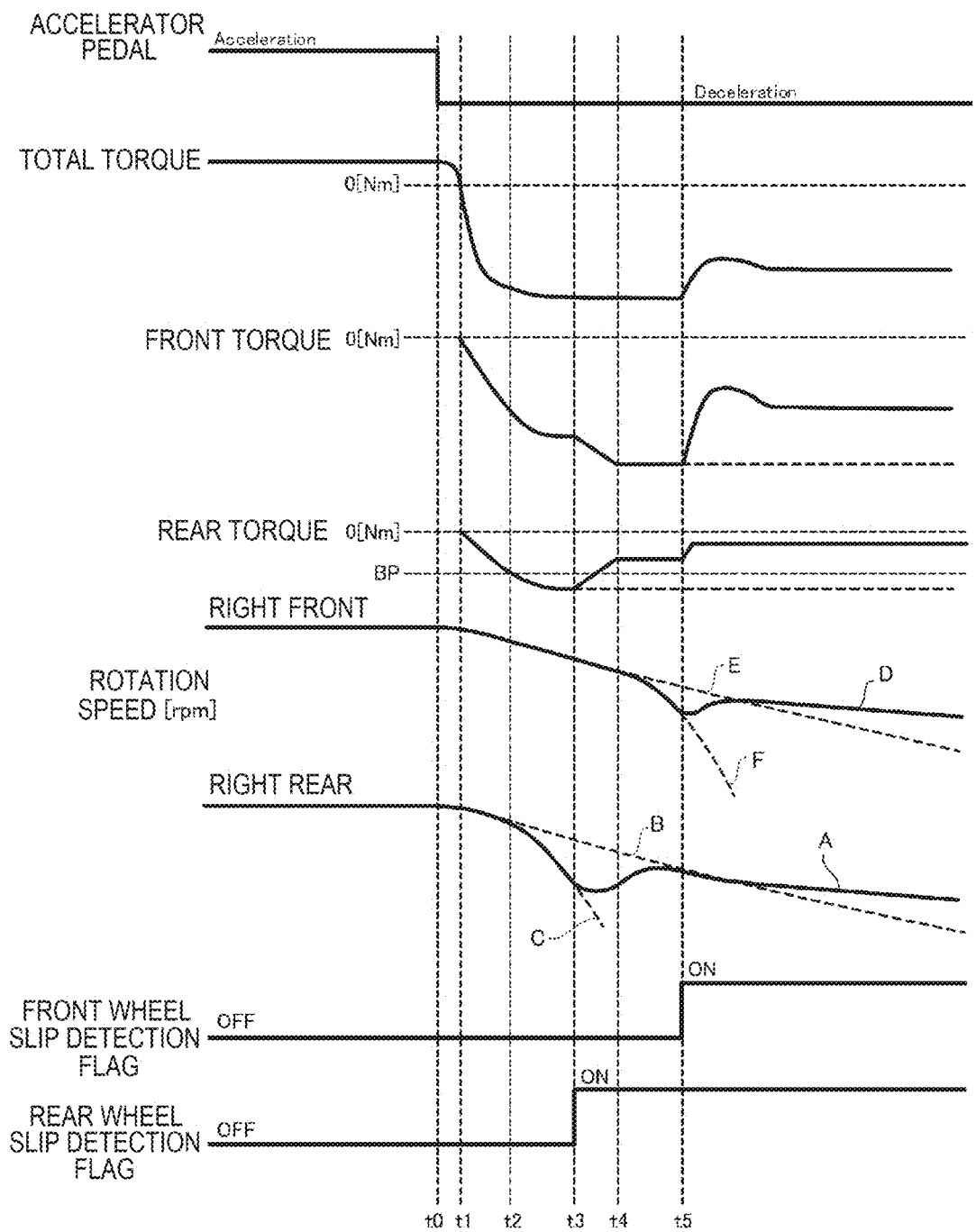
FIG. 10 is a time chart when a rear braking torque limiting process B and the front braking torque control are executed after the rear braking torque limiting process A is executed.

FIG. 10 is a time chart when the process B and the front braking torque control are executed after the process A is executed. FIG. 10 is a time chart when a slip occurs in the front wheel after the process A is executed. Therefore, the total torque (front torque and rear torque) and the rotation speeds of the drive wheels 9 (right front drive wheel, left front drive wheel, right rear drive wheel, and left rear drive wheel) shown in FIG. 10 change in the same manner as in the time chart of FIG. 9 until time t4. In FIG. 10, curves indicating the rotation speeds of the drive wheels 9 (left front drive wheel and left rear drive wheel) are not shown.

When the motor controller 2 executes the process A and the distribution torque of the front torque (front braking torque) increases, for example, at time t4, the rotation speed of the right front drive wheel 9 starts to become lower than the rotation speeds of the other drive wheels 9 (left front drive wheel and left rear drive wheel), and a slip occurs.

At time t5, the motor controller 2 determines that the slip ratio S of the right front drive wheel 9 exceeds the threshold Sthmin (Sth when the driver is depressing the brake pedal), and turns on a front wheel slip detection flag. As a result, the determination in step S316 shown in FIG. 5 becomes YES, and the front braking torque control in step S318 is executed.

At the time t5, the motor controller 2 determines YES in step S306 and executes the process B in step S311 on the condition that the determination in step S310 is YES. That is, at the time t5, the front braking torque control for the front wheel and the process B for the rear wheel are executed substantially simultaneously.

The cause of the slip of the front wheel at the time t5 includes a case where the front wheel runs onto a road surface with even lower friction ratio at the time t5, in addition to a case where the distribution torque of the front torque (front braking torque) increases. Therefore, since the rear wheel runs onto the road surface after the front wheel runs onto the road surface, the slip (slip tendency degree ST) of the rear wheel may increase again. Therefore, when the front braking torque control is executed, it is preferable to also execute the process B (or process C). However, the process B does not necessarily have to be executed, and for example, the driver may be allowed to select whether to execute the process B.

As described above, the slip ratio S of the front wheel is calculated according to (rotation speed of rear wheel−rotation speed of front wheel)/(rotation speed of rear wheel). Therefore, by reliably avoiding the slip of the rear wheel by the process B, the reliability of the slip ratio S of the front wheel can be enhanced, and the front braking torque control can be reliably executed.

The front braking torque control increases the front torque (decreases the front braking torque) such that at least the slip ratio S of the front wheel does not tend to increase, and may be overshooting or undershooting as shown in FIG. 10. In any case, the slip of the right front drive wheel 9 is eliminated in such a manner that the rotation speed (curve D) of the right front drive wheel 9 approaches the rotation speed (curve A) of the right rear drive wheel 9 by executing the front braking torque control after the time t5.

In FIG. 10, a curve E (broken line) indicating the rotation speed of the right front drive wheel 9 represents a case where no slip occurs in the front wheel and the front braking torque control is not executed. A curve F indicates a case where the front braking torque control is not executed even when a slip occurs in the right front drive wheel 9, and in this case, the rotation speed of the right front drive wheel 9 rapidly decreases and the rotation is locked. A curve B and a curve C are the same as the curve B and the curve C in FIG. 9, respectively.

After the time t5, although the front torque (front braking torque) converges to a predetermined value, and the rear torque (rear braking torque) also maintains a predetermined value, by executing the front braking torque control and the process B, the total torque increases, that is, the total braking torque decreases.

Therefore, after the time t5, the curve A representing the rotation speed of the right rear drive wheel 9 does not converge to the curve B, and monotonously decreases in a state where the rotation speed is higher than that of the curve B and a slope is gentler than that of the curve B. Similarly, the curve D representing the rotation speed of the right front drive wheel 9 does not converge to the curve E, and monotonously decreases in a state where the rotation speed is higher than that of the curve E and a slope is gentler than that of the curve E.

When a slip is not detected in the rear wheel and a slip is detected in the front wheel during deceleration, the front braking torque control (and process B) is executed without executing the process A.

<Time Chart of Process C and Front Braking Torque Control>

Figure 11:
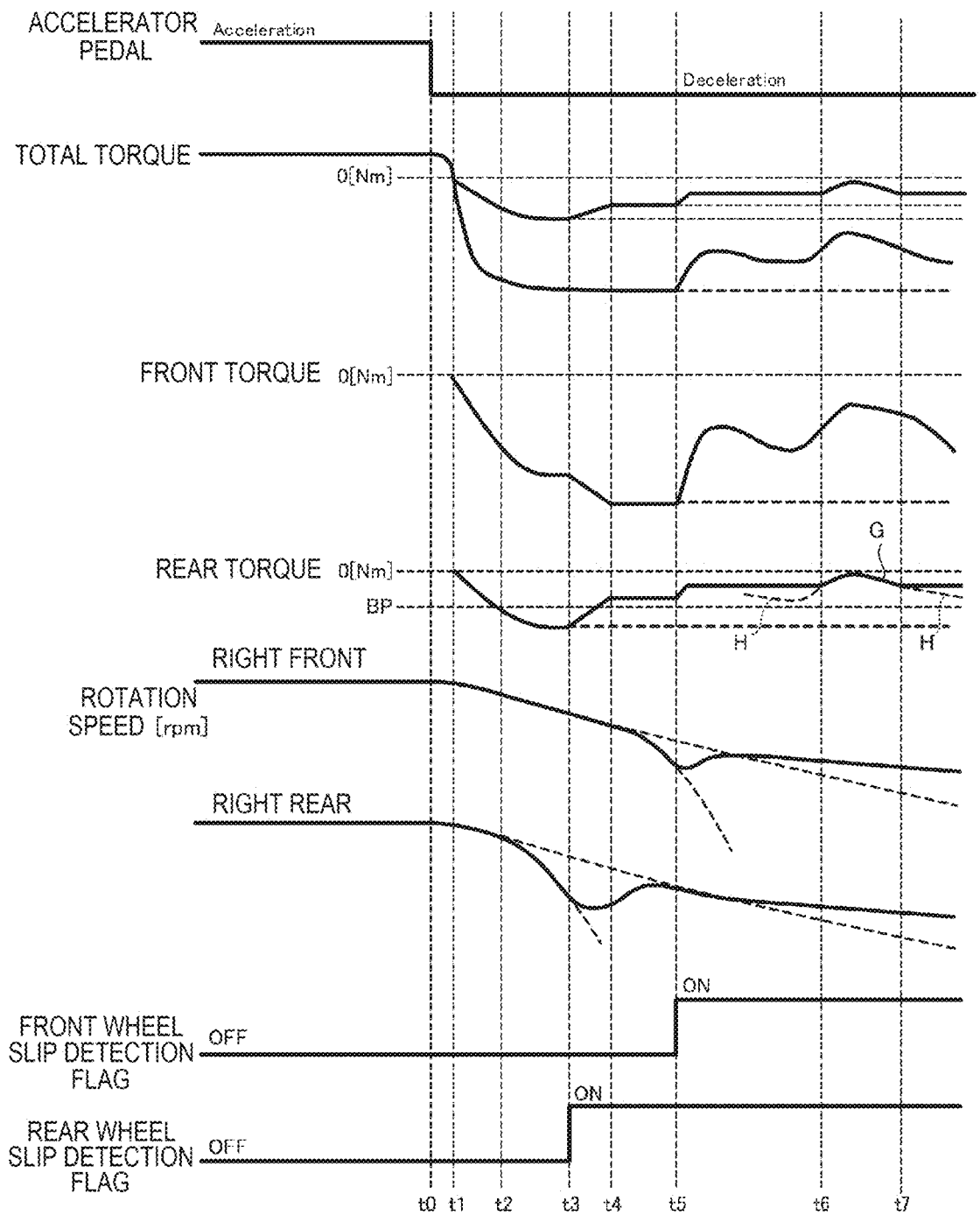
FIG. 11 is a time chart when the rear braking torque limiting process B, a rear braking torque limiting process C, and the front braking torque control are executed after the rear braking torque limiting process A is executed.

FIG. 11 is a time chart when the rear braking torque limiting process B, the rear braking torque limiting process C, and the front braking torque control are executed after the rear braking torque limiting process A is executed. FIG. 11 is a time chart when the process C is executed as a result of the distribution torque of the rear torque (rear braking torque) exceeding a specified value (for example, 0.3) due to the front wheel running onto a road surface with even lower friction force and the front motor torque command value Tmf increasing (front braking torque decreasing) even though the process A, the front braking torque control, and the process B are executed as in the time chart shown in FIG. 10. Therefore, the total torque (front torque and rear torque) and the rotation speeds of the drive wheels 9 (right rear drive wheel and left rear drive wheel) shown in FIG. 11 change in the same manner as in the time chart of FIG. 10 until the time t5. In FIG. 11, curves indicating the rotation speeds of the drive wheels 9 (left front drive wheel and left rear drive wheel) are also not shown.

In FIG. 11, a curve G represents the rear torque (rear braking torque) when the process A, the front braking torque control, the process B, and the process C are executed. A curve H represents the rear torque (rear braking torque) when the process C is executed without executing the process B after the process A and the front braking torque control are executed.

That is, in step S310 of FIG. 5, the motor controller 2 compares the rear motor torque command value Tmr calculated by the process B (process A when process B is not executed) with the rear motor torque command value Tmr obtained by the process C, and selects the higher value (the smaller braking torque).

As shown in FIG. 11, between time t6 and time t7, since the value of the rear motor torque command value Tmr obtained by the process C is greater than the rear motor torque command value Tmr calculated by the process B, the rear motor torque command value Tmr calculated by the process C is applied as the rear torque (rear braking torque). However, in the process C, when a ratio (Tmf:Tmr) between the front motor torque command value Tmf calculated by the front braking torque control and the rear motor torque command value Tmr is considered, the value of the rear motor torque command value Tmr is controlled so as to maintain, for example, 0.7:0.3, so that the rear motor torque command value Tmr (rear braking torque) does not become zero.

On the other hand, between the time t5 and the time t6 and after the time t7, since the value of the rear motor torque command value Tmr obtained by the process C is less than the rear motor torque command value Tmr calculated by the process B, the rear motor torque command value Tmr calculated by the process B is applied as the rear torque (rear braking torque).

Figure 12:
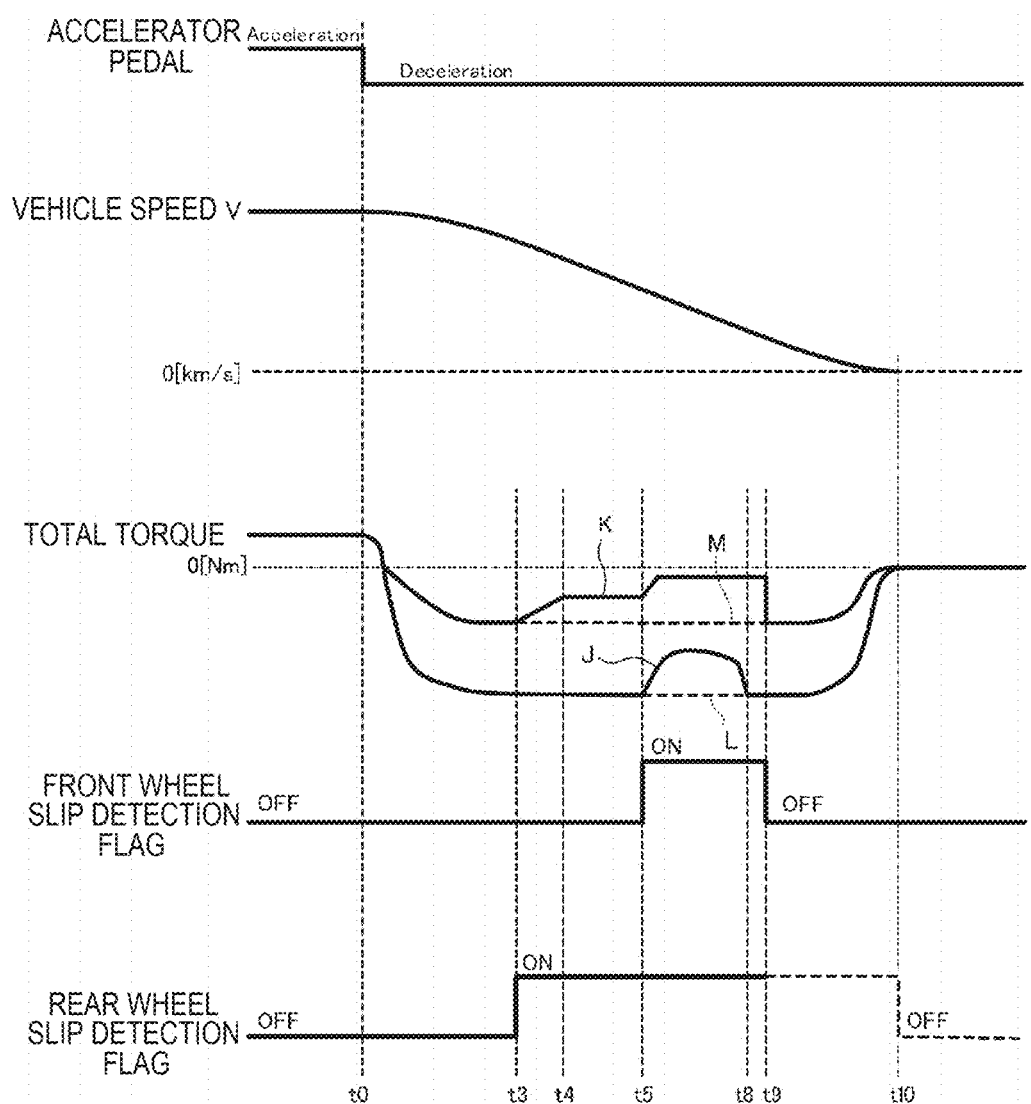
FIG. 12 is a time chart when an electric vehicle is braked and stopped and the front braking torque control and the like are canceled.

In the time charts of FIGS. 10, 11, and 12, when the driver strongly depresses the brake pedal (when brake operation amount BR is large), it is difficult to execute any of the process A, the process B, the process C, and the front braking torque control. That is, since the threshold STth shown in FIG. 6 is increased, the determination in step S308 of FIG. 5 is likely to be NO, and since the threshold Sth shown in FIG. 7 is increased, the determination in step S316 of FIG. 5 is likely to be NO. If a slip occurs in the front wheel or the rear wheel when the above processes are not executed, the motor controller 2 eliminates the slip by the ABS control.

<Time Chart when Electric Vehicle is Stopped>

FIG. 12 is a time chart when the electric vehicle is braked and stopped and the front braking torque control and the like are canceled. Similar to FIG. 10, FIG. 12 shows a time chart in a case where after the process A, the front braking torque control, and the process B are executed during deceleration, the friction force of the road surface is restored by getting out of the wet road surface, an original braking torque can be applied to the front wheel (rear wheel), and the electric vehicle is stopped.

Therefore, the total torque (front torque and rear torque) and the rotation speeds of the drive wheels 9 (right front drive wheel, left front drive wheel, right rear drive wheel, and left rear drive wheel) change in the same manner as in the time chart of FIG. 10 until the time t5. In FIG. 12 (the same applies to FIG. 13), curves indicating the front torque and the rotation speeds of the drive wheels 9 are not shown.

In FIG. 12, a curve J represents a total torque in which the front braking torque control and the process B are reflected, and a curve K represents a rear torque component in the total torque.

A curve L is a total torque determined by the one-pedal control, and matches the curve J at times other than between the time t5 and time t8. Further, a curve M is a rear torque component in the total torque represented by the curve L, and matches the curve K at times other than between the time t3 and time t9.

In the curve J, the change between the time t5 and the time t8 indicates that the total torque increases (the braking torque decreases) due to the execution of the front braking torque control and the process B.

As described above, when the friction force of the road surface is restored, the front motor torque command value Tmf set by the front braking torque control decreases (the front braking torque increases), and at the time t8, the front torque (front motor torque command value Tmf) matches the front torque (front motor torque command value Tmf) determined by the one-pedal control.

Alternatively, at the time t8, the total torque matches the total torque determined by the one-pedal control. At this time, the front motor torque command value Tmf is a value less than the front motor torque command value Tmf determined by the one-pedal control by a difference between the torques of the curve K and the curve M.

Here, a period between the time t8 and the time t9 is the specified time of step S321 of FIG. 5. Therefore, at the time t9, the motor controller 2 determines that the slip of the front wheel is eliminated, and turns off the front wheel slip detection flag.

Accordingly, the determination in step S316 of FIG. 5 becomes NO, and in step S317, the front torque is switched from the front motor torque command value Tmf determined in step S320 to the front motor torque command value Tmf determined by the one-pedal control.

When the determination in step S306 in FIG. 5 is NO, the process B in step S311 is canceled, and when the determination in step S308 is NO, the process A in step S309 is also canceled. Therefore, after the time t9, the total torque shown by the curve J in FIG. 12 matches the curve L, and the rear torque component shown by the curve K matches the curve M.

At the time t9, the rear torque component shown by the curve K changes stepwise, but may gradually change to the position of the curve M. Correspondingly, the front torque may also gradually change from the front motor torque command value Tmf determined in step S320 to the front motor torque command value Tmf determined by the one-pedal control.

After the time t9, the vehicle speed V becomes zero at time t10. The motor controller 2 can turn off the rear wheel slip detection flag at the time t9, the time t10, or when the next braking torque is generated in the electric vehicle.

When a slip is not detected in the rear wheel and a slip is detected in the front wheel during deceleration, the front braking torque control (and processes B and C) is executed without executing the process A.

<Time Chart when Electric Vehicle Re-Accelerates>

Figure 13:
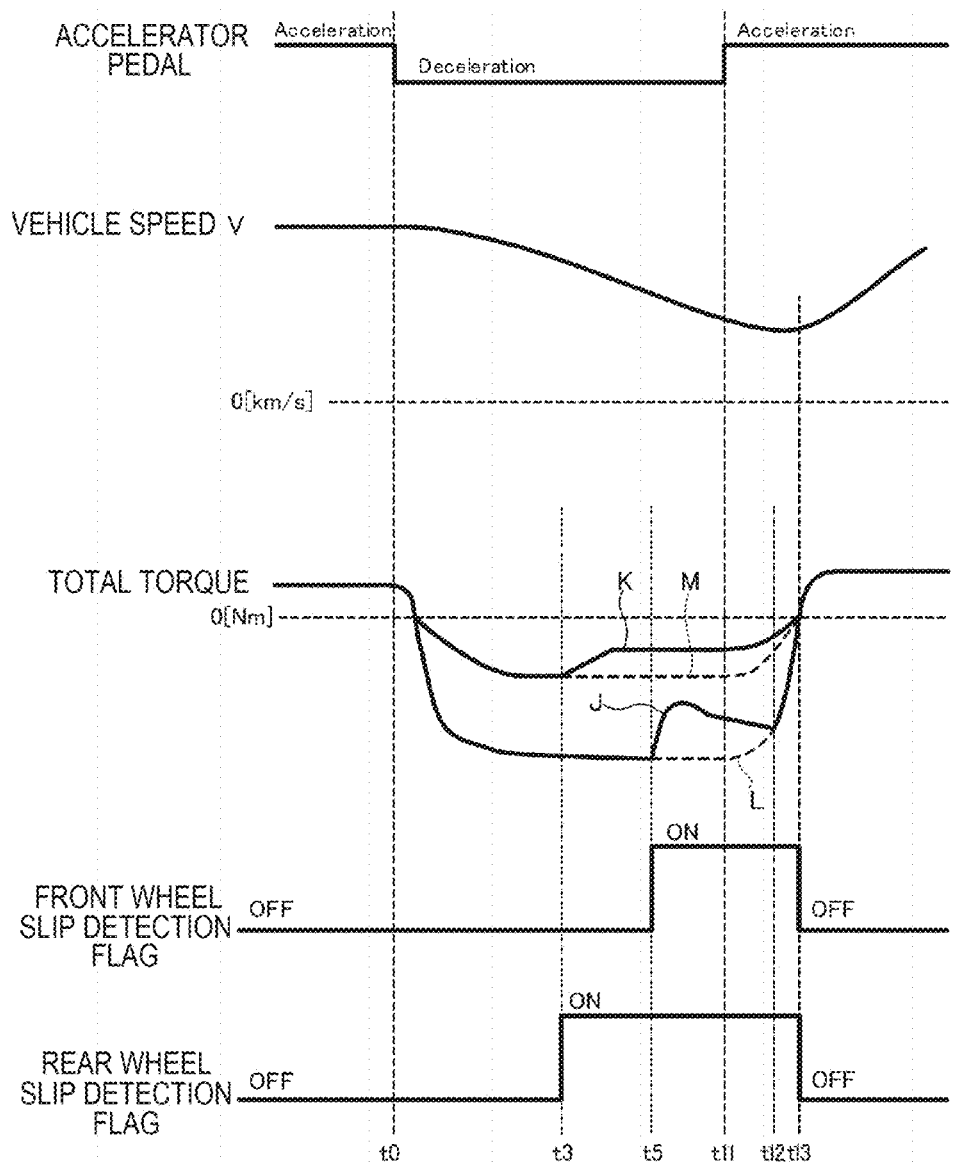
FIG. 13 is a time chart when an electric vehicle re-accelerates without stopping after braking and the front braking torque control and the like are canceled.

FIG. 13 is a time chart when the electric vehicle re-accelerates without stopping after braking and the front braking torque control and the like are canceled. FIG. 13 is a time chart when the process A and the front braking torque control are executed during deceleration (here, process B is not executed), and then the total torque is switched from the braking torque (negative torque) to the driving torque (positive torque) by the driver depressing the accelerator pedal.

In FIG. 13, the total torque (front torque and rear torque) and the rotation speeds of the drive wheels 9 (right front drive wheel, left front drive wheel, right rear drive wheel, and left rear drive wheel) change in the same manner as in the time chart of FIG. 10 until the time t5.

At the time t5, the motor controller 2 turns on the front wheel slip detection flag by detecting a slip of the front wheel, and executes the front braking torque control.

Thereafter, at the time t1, when the driver depresses the accelerator pedal (acceleration), the total torque starts to increase (the braking torque starts to decrease).

At time t12, the total torque (curve J) reflecting the process A and the front braking torque control matches the total torque determined by the one-pedal control (or the total torque corresponding to the total regenerative current generated by the front drive motor 4f and the rear drive motor 4r) (curve L).

At time t13, the total torque becomes a predetermined value (for example, zero), and thereafter, the total torque becomes the driving torque, and the electric vehicle resumes acceleration. Here, a case where a period between the time t12 and the time t13 is shorter than the specified time of step S321 of FIG. 5 will be considered. However, in this case, the total torque (braking torque) also becomes zero at the time t13, and it can be determined that the slip of the front wheel is eliminated. Therefore, the motor controller 2 can turn off the front wheel slip detection flag. The rear wheel slip detection flag can also be turned off at the time t13, and may be turned off when the next braking torque is generated.

In any case, since the total torque becomes zero, the determination in step S303 of FIG. 5 becomes NO. Therefore, the motor controller 2 can set the front motor torque command value Tmf and the rear motor torque command value Tmr to values determined by the one-pedal control by canceling all of the process A, the process B, the process C, and a front regeneration limiting process (step S304).

Effects of Present Embodiment

According to the electric vehicle control method of the present embodiment for braking of an electric vehicle by applying a front braking torque to the front drive motor 4f that drives a front wheel and applying a rear braking torque to the rear drive motor 4r that drives a rear wheel, during braking, a torque limiting process (process B, process C, and front braking torque control) for reducing the front braking torque and the rear braking torque is executed when a slip of the front wheel is detected, and distribution torque changing process (process A) for increasing the front braking torque while maintaining a sum of the front braking torque and the rear braking torque is executed when a slip of the rear wheel is detected.

According to the above method, when the slip of the front wheel is detected, not only the front braking torque but also the rear braking torque is reduced. As a result, the slip of the front wheel is eliminated, and an increase in a distribution torque to the rear drive motor $4r$ is prevented, thereby avoiding an oversteer state of the electric vehicle. When the slip of the rear wheel is detected, the front braking torque is increased and the rear braking torque is decreased while a total braking torque is maintained. As a result, since the slip of the rear wheel is eliminated, and a minimum braking torque of the rear wheel is kept while the total braking torque is maintained, a driver does not feel uncomfortable with the deceleration of the electric vehicle, and an inclination of a pitch angle of the electric vehicle in a traveling direction, that is, the forward leaning can be reduced, thereby reducing the unpleasant feeling of the driver. As described above, it is possible to stabilize the behavior of the electric vehicle during braking and reduce the unpleasant feeling.

In the present embodiment, when the slip of the front wheel is detected, the rear braking torque is set to be lower than the rear braking torque at the time of a distribution torque changing process (process B). That is, when the slip of the front wheel is detected, the rear motor torque command value Tmr is set to be higher than the rear motor torque command value Tmr at the time of the distribution torque changing process. Since the rear wheel runs onto a road surface where the front wheel runs onto, if a slip is detected in the front wheel, a slip may be detected in the rear wheel thereafter, and this may occur even after the distribution torque changing process (process A) is executed. Therefore, by setting the rear motor torque command value Tmr to be higher than the rear motor torque command value Tmr at the time of the distribution torque changing process (process A) when the slip of the front wheel is detected, the slip of the rear wheel can be reliably avoided, and the reliability of the slip ratio S of the front wheel calculated based on a rotation speed of the rear wheel and a rotation speed of the front wheel can be enhanced.

In the present embodiment, when the slip of the front wheel is detected, front braking torque control is executed so as to eliminate the slip of the front wheel, and the rear braking torque is controlled such that a ratio of the rear braking torque to the front braking torque does not exceed a specified value (for example, front braking torque:rear braking torque=0.7:0.3) (control C). As a result, the slip of the front wheel is eliminated, and an increase in the distribution torque to the rear drive motor $4r$ is prevented, thereby reliably avoiding an oversteer state of the electric vehicle.

In the present embodiment, when one-pedal control for controlling the front braking torque based on an accelerator operation amount is possible, the torque limiting process is executed in preference to the one-pedal control, and the torque limiting process is canceled when the front braking torque related to the front braking torque control reaches the front braking torque related to the one-pedal control.

As a result, distribution torques of the front drive motor $4f$ and the rear drive motor $4r$ can be constant after a friction force of the road surface is restored, and thus a pitch during braking of the electric vehicle can be stabilized.

In the present embodiment, when one-pedal control for controlling the front braking torque based on the accelerator operation amount is possible, the torque limiting process is executed in preference to the one-pedal control, and the torque limiting process is canceled when the front braking torque related to the one-pedal control reaches a predetermined value (for example, zero).

As a result, the electric vehicle can be stably re-accelerated.

In the present embodiment, when the vehicle speed V of the electric vehicle becomes zero, the torque limiting process and the distribution torque changing process are canceled. As a result, the torque limiting process and the distribution torque changing process can be easily and reliably canceled.

In the present embodiment, the slip (slip tendency degree ST) of the rear wheel is detected based on a ratio of a change amount in a rotation speed of the rear drive motor $4r$ to the rear braking torque. Thus, the slip of the rear wheel can be quickly detected independently of the front wheel.

In the present embodiment, the slip (slip tendency degree ST) of the rear wheel is detected by whether the ratio of the change amount in the rotation speed of the rear drive motor $4r$ to the rear braking torque exceeds a predetermined threshold (STth), and the threshold (Stth) is increased as an operation amount of a friction brake (brake operation amount BR) increases.

As a result, a brake operation by the friction brake is preferentially executed, so that the braking of the electric vehicle can be stably performed.

The electric vehicle control system according to the present embodiment is an electric vehicle control system including the front drive motor $4f$ that drives a front wheel, the rear drive motor $4r$ that drives a rear wheel, and a control unit (motor controller 2) that drives and controls the front drive motor $4f$ and the rear drive motor $4r$, in which the control unit (motor controller 2) causes an electric vehicle to brake by applying a front braking torque to the front drive motor $4f$ and applying a rear braking torque to the rear drive motor $4r$, and during braking, the control unit (motor controller 2) executes a torque limiting process (process B, process C, and front braking torque control) that reduces the front braking torque and the rear braking torque when a slip of the front wheel is detected, and executes a distribution torque changing process (process A) that increases the front braking torque while maintaining a sum of the front braking torque and the rear braking torque when a slip of the rear wheel is detected.

According to the above configuration, when the slip of the front wheel is detected, not only the front braking torque but also the rear braking torque is reduced. As a result, the slip of the front wheel is eliminated, and an increase in a distribution torque to the rear drive motor $4r$ is prevented, thereby avoiding an oversteer state of the electric vehicle. When the slip of the rear wheel is detected, the front braking torque is increased and the rear braking torque is decreased while a total braking torque is maintained. As a result, since the slip of the rear wheel is eliminated, and a minimum braking torque of the rear wheel is kept while the total braking torque is maintained, a driver does not feel uncomfortable with the deceleration of the electric vehicle, and an inclination of a pitch angle of the electric vehicle in a traveling direction, that is, the forward leaning can be reduced, thereby reducing the unpleasant feeling of the driver. As described above, it is possible to stabilize the behavior of the electric vehicle during braking and reduce the unpleasant feeling.

The invention claimed is:

1. An electric vehicle control method for braking of an electric vehicle by applying a front braking torque to a front drive motor that drives a front wheel and applying a rear braking torque to a rear drive motor that drives a rear wheel, the electric vehicle control method comprising:
during the braking,
executing a distribution torque changing process that increases the front braking torque proportional to a decrease in the rear braking torque when a slip of the rear wheel is detected, wherein a sum of the front braking torque and the rear braking torque is substantially maintained during the distribution torque changing process; and
executing a torque limiting process that reduces the front braking torque and the rear braking torque when the slip of the rear wheel is eliminated by the distribution torque changing process and a slip of the front wheel is detected.

2. The electric vehicle control method according to claim 1, wherein
when the slip of the front wheel is detected, the rear braking torque is set to be lower than the rear braking torque at a time of the distribution torque changing process.

3. The electric vehicle control method according to claim 1, wherein
when the slip of the front wheel is detected, front braking torque control for eliminating the slip of the front wheel is executed, and the rear braking torque is controlled such that a ratio of the rear braking torque to the front braking torque does not exceed a specified value.

4. The electric vehicle control method according to claim 3, wherein
when one-pedal control for controlling the front braking torque based on an accelerator operation amount is selected,
the torque limiting process is executed in preference to the one-pedal control, and
the torque limiting process is canceled when a front braking torque calculated in the front braking torque control reaches a front braking torque of the one-pedal control.

5. The electric vehicle control method according to claim 1, wherein
when one-pedal control for controlling the front braking torque based on an accelerator operation amount is selected,
the torque limiting process is executed in preference to the one-pedal control, and
the torque limiting process is canceled when a front braking torque of the one-pedal control reaches a predetermined value.

6. The electric vehicle control method according to claim 1, wherein
the torque limiting process and the distribution torque changing process are canceled when a vehicle speed of the electric vehicle becomes zero.

7. The electric vehicle control method according to claim 1, wherein
the slip of the rear wheel is detected based on a ratio of a change amount in a rotation speed of the rear drive motor to the rear braking torque.

8. The electric vehicle control method according to claim 1, wherein
the slip of the rear wheel is detected based on whether a ratio of a change amount in a rotation speed of the rear drive motor to the rear braking torque exceeds a predetermined threshold, and
the predetermined threshold is increased as an operation amount of a friction brake increases.

9. The electric vehicle control method according to claim 1, wherein
the slip of the rear wheel is eliminated when a rotation speed of a slipping drive wheel converges to a rotation speed of another drive wheel.

10. An electric vehicle control system, comprising:
a front drive motor configured to drive a front wheel;
a rear drive motor configured to drive a rear wheel; and
a control unit configured to drive and control the front drive motor and the rear drive motor, wherein
the control unit causes an electric vehicle to brake by applying a front braking torque to the front drive motor and applying a rear braking torque to the rear drive motor, and
the control unit executes:
during braking of the electric vehicle,
a distribution torque changing process that increases the front braking torque proportional to a decrease in the rear braking torque when a slip of the rear wheel is detected, wherein a sum of the front braking torque and the rear braking torque is substantially maintained during the distribution torque changing process, and
a torque limiting process that reduces the front braking torque and the rear braking torque when the slip of the rear wheel is eliminated by the distribution torque changing process and a slip of the front wheel is detected.

11. The electric vehicle control system according to claim 10, wherein
the slip of the rear wheel is eliminated when a rotation speed of a slipping drive wheel converges to a rotation speed of another drive wheel.

* * * * *